United States Patent
Kurokawa

(10) Patent No.: US 9,667,819 B2
(45) Date of Patent: May 30, 2017

(54) IMAGE READING APPARATUS HAVING FIRST AND SECOND SENSORS FOR READING IMAGES

(71) Applicant: BROTHER KOGYO KABUSHIKI KAISHA, Nagoya-shi, Aichi-ken (JP)

(72) Inventor: Kotaro Kurokawa, Ichinomiya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/626,545

(22) Filed: Feb. 19, 2015

(65) Prior Publication Data
US 2015/0242716 A1    Aug. 27, 2015

(30) Foreign Application Priority Data
Feb. 21, 2014   (JP) .................................. 2014-031720

(51) Int. Cl.
*H04N 1/00*    (2006.01)
(52) U.S. Cl.
CPC .............................. *H04N 1/00551* (2013.01)
(58) Field of Classification Search
None
See application file for complete search history.

(56) References Cited

U.S. PATENT DOCUMENTS

| | | | | |
|---|---|---|---|---|
| 5,532,809 A | * | 7/1996 | Hamanaka | G03G 15/60 271/3.15 |
| 5,907,759 A | * | 5/1999 | Yashiro | G03G 15/60 271/3.06 |
| 6,721,074 B1 | * | 4/2004 | Kao | H04N 1/2032 271/160 |
| 2002/0018227 A1 | * | 2/2002 | Asahi | B41J 13/0036 358/1.13 |
| 2003/0202218 A1 | * | 10/2003 | Morinaga | H04N 1/00525 358/474 |

(Continued)

FOREIGN PATENT DOCUMENTS

| | | |
|---|---|---|
| JP | 9-46472 A | 2/1997 |
| JP | 11-136442 A | 5/1999 |

(Continued)

OTHER PUBLICATIONS

Office Action issued in related Japanese application No. 2014-031720, mailed Apr. 4, 2017.

*Primary Examiner* — Ming Hon
(74) *Attorney, Agent, or Firm* — Merchant & Gould P.C.

(57) ABSTRACT

An image reading apparatus includes a first unit, which has a support surface and a first reading unit, and a second unit mounted to the first unit. The second unit includes a conveyor for conveying a sheet along a predetermined conveyance path, a feeder unit and a discharge unit. The conveyor includes a first conveyance roller and a separation piece. The first conveyance roller and the separation piece and the first reading unit stopped at a stop position are arranged at positions at which arrangement ranges thereof overlap with each other with respect to a direction parallel with the support surface and orthogonal to an axis line becoming a rotation center of the first conveyance roller, as seen from a direction parallel with the axis line of the first conveyance roller.

17 Claims, 5 Drawing Sheets

(56) References Cited

U.S. PATENT DOCUMENTS

| | | | |
|---|---|---|---|
| 2005/0157319 A1* | 7/2005 | Mizuhashi | H04N 1/4095 358/1.9 |
| 2005/0254105 A1 | 11/2005 | Muzzin et al. | |
| 2008/0080024 A1 | 4/2008 | Ishido | |
| 2009/0168127 A1 | 7/2009 | Hamada et al. | |
| 2010/0118356 A1* | 5/2010 | Sheng | H04N 1/121 358/483 |
| 2010/0245946 A1 | 9/2010 | Takeuchi et al. | |
| 2010/0245947 A1 | 9/2010 | Takeuchi et al. | |
| 2010/0277776 A1 | 11/2010 | Osakabe | |
| 2011/0051157 A1* | 3/2011 | Oteki | H04N 1/393 358/1.9 |
| 2011/0169214 A1* | 7/2011 | Hosaka | B41J 29/10 271/226 |
| 2011/0242622 A1 | 10/2011 | Takeuchi et al. | |

FOREIGN PATENT DOCUMENTS

| | | |
|---|---|---|
| JP | 2003-309703 A | 10/2003 |
| JP | 2005-333633 A | 12/2005 |
| JP | 2007-166229 A | 6/2007 |
| JP | 2008-048190 A | 2/2008 |
| JP | 2009-164764 A | 7/2009 |
| JP | 2010-259059 A | 11/2010 |
| JP | 2010-263318 A | 11/2010 |
| JP | 4818038 B2 | 11/2011 |
| JP | 5126270 B2 | 1/2013 |

* cited by examiner

IMAGE READING APPARATUS HAVING FIRST AND SECOND SENSORS FOR READING IMAGES

CROSS-REFERENCE TO RELATED APPLICATIONS

This application claims priority from Japanese Patent Application No. 2014-031720 filed on Feb. 21, 2014, the entire subject-matter of which is incorporated herein by reference.

TECHNICAL FIELD

The disclosure relates to an image reading apparatus.

BACKGROUND

There has been disclosed a configuration of an image reading apparatus of an automatic document feeder (ADF) type configured to read an image of a document while conveying the document.

The above-described related-art image reading apparatus is configured to convey a plurality of documents supported on a sheet supply tray toward a downstream side in a conveying direction by a suction roller and to separate the documents one at a time by a separation roller. The separated document is further conveyed toward the downstream side in the conveying direction, is curved by a reverse roller forming a curved path and is conveyed toward a sheet discharge tray arranged below the sheet supply tray.

When the document is conveyed, a backside of the document is read by an ADF-image sensor at an upstream side of the curved path and a surface of the document is read by an FB (Flat Bed)-image sensor at a downstream side of the curved path. The FB-image sensor is configured to read an image of a stationary document placed on a document platen while moving along the document platen. When reading the document being conveyed by the ADF, the FB-image sensor is stopped at a predetermined stop position and reads an image of the document passing through a reading position at the downstream side of the curved path.

According to the above-described related-art image reading apparatus, a document pressing member for suppressing the document being conveyed from floating above, an urging member for urging the document pressing member toward the FB-image sensor, and the like are arranged above the FB-image sensor stopped at the stop position. The ADF-image sensor is arranged further above the corresponding components.

However, when the ADF-image sensor is arranged at the corresponding position, it is difficult to reduce a height size of the part at which the ADF-image sensor is arranged. For this reason, it is difficult to make the image reading apparatus thin.

SUMMARY

Therefore, it is preferably to provide an image reading apparatus that may be made to be thinner than the related art.

In one aspect of the disclosure, an image reading apparatus comprises: a first unit having a support surface for supporting a reading target; and a second unit mounted to the first unit and configured to be displaceable between a closed position at which the support surface is covered and an opened position at which the support surface is exposed, wherein the second unit comprises a conveyor configured to convey a sheet along a predetermined conveyance path, wherein the first unit comprises: a first contact part to which the sheet being conveyed by the conveyor is contacted; and a first reading unit configured to: read an image of the reading target, which is supported by the support surface, with moving along the support surface; and read an image of the sheet, which is passing through a first reading position with contacting the first contact part, while the first reading unit stops at a stop position facing the conveyance path with the first contact part being interposed therebetween, wherein the conveyor comprises: a first conveyance roller configured to separate the sheet fed from an upstream side in a conveying direction one at a time at a first position on the conveyance path and to convey the sheet toward a downstream in a conveying direction; and a separation piece configured to separate the sheet one at a time in cooperation with the first conveyance roller, and wherein the first conveyance roller and the separation piece and the first reading unit stopped at the stop position are arranged at positions at which an arrangement range of the first conveyance roller and the separation piece and an arrangement range of the first reading unit overlap with each other with respect to a direction parallel with the support surface and orthogonal to an axis line becoming a rotation center of the first conveyance roller, as seen from a direction parallel with the axis line becoming the rotation center of the first conveyance roller.

According to another aspect of the disclosure, an image reading apparatus comprises: a first unit having a support surface for supporting a reading target; and a second unit mounted to the first unit and configured to be displaceable between a closed position at which the support surface is covered and an opened position at which the support surface is exposed, wherein the second unit comprises a conveyor configured to convey a sheet along a predetermined conveyance path, wherein the first unit comprises: a first contact part to which the sheet being conveyed by the conveyor is contacted; and a first reading unit configured to: read an image of the reading target, which is supported by the support surface, with moving along the support surface; and read an image of the sheet, which is passing through a first reading position with contacting the first contact part, while the first reading unit stops at a stop position facing the conveyance path with the first contact part being interposed therebetween, wherein the conveyor comprises: a first guide part configured to guide the sheet, which is conveyed from a vicinity of a downstream end of the feeder unit in a conveying direction toward a further downstream side in the conveying direction, in a direction inclined at a downward gradient; a second guide part configured to guide the sheet, which is conveyed from a vicinity of a downstream end of the first guide part in the conveying direction toward a further downstream side in the conveying direction, in a direction inclined at an upward gradient; a third guide part configured to guide the sheet, which is conveyed from a vicinity of a downstream end of the second guide part in the conveying direction toward a further downstream side in the conveying direction, in a direction of curving the sheet with respect to the guiding direction of the second guide part; a fourth guide part configured to guide the sheet, which is conveyed from a vicinity of a downstream end of the third guide part in the conveying direction toward a further downstream side in the conveying direction, in a direction inclined at a downward gradient; a fifth guide part configured to guide the sheet, which is conveyed from a vicinity of a downstream end of the fourth guide part in the conveying direction toward a further downstream side in the conveying direction, in a direction inclined at an upward gradient; a first conveyance roller, which is arranged at the second guide part, and which is configured to separate the sheet fed from the feeder unit one at a time at a first position and to convey the sheet toward the downstream side in the conveying direction; and a separation piece configured to separate the sheet one at a time in cooperation with the first conveyance roller, and wherein the first conveyance roller and the separation piece and the first reading unit stopped at the stop position are arranged at positions at which an arrangement range of the first conveyance roller and the separation piece and an arrangement range of the first reading unit overlap with each other with respect to a direction parallel with the support surface and orthogonal to an axis line becoming a rotation center of the first conveyance roller, as seen from a direction parallel with the axis line becoming the rotation center of the first conveyance roller.

According to still another aspect of the disclosure, an image reading apparatus comprises: a first unit having a support surface for supporting a reading target; and a second unit mounted to the first unit and configured to be displaceable between a closed position at which the support surface is covered and an opened position at which the support surface is exposed, wherein the second unit comprises a conveyor configured to convey a sheet along a predetermined conveyance path, wherein the first unit comprises: a first contact part to which the sheet being conveyed by the conveyor is contacted; and a first reading unit configured to: read an image of the reading target, which is supported by the support surface, with moving along the support surface; and read an image of the sheet, which is passing through a first reading position with contacting the first contact part, while the first reading unit stops at a stop position facing the conveyance path with the first contact part being interposed therebetween, wherein the conveyor comprises: a first conveyance roller configured to separate the sheet fed from an upstream side in a conveying direction one at a time at a first position on the conveyance path and to convey the sheet toward a downstream in a conveying direction; and a separation piece configured to separate the sheet one at a time in cooperation with the first conveyance roller, and wherein at least one virtual line, from among virtual lines orthogonal to an extension plane of an upper surface of the support surface, intersects the first conveyance roller, the separation piece and the first reading unit stopped at the stop position, as seen from a direction parallel with the axis line becoming the rotation center of the first conveyance roller.

BRIEF DESCRIPTION OF THE DRAWINGS

The present disclosure is illustrated, and not limited, by way of example by the accompanying figures in which like reference numerals indicate similar elements.

DETAILED DESCRIPTION

Hereinafter, an image reading apparatus will be described in detail with reference to an illustrative embodiment.

(1) Configuration of Multi-Function Device

Figure 1:
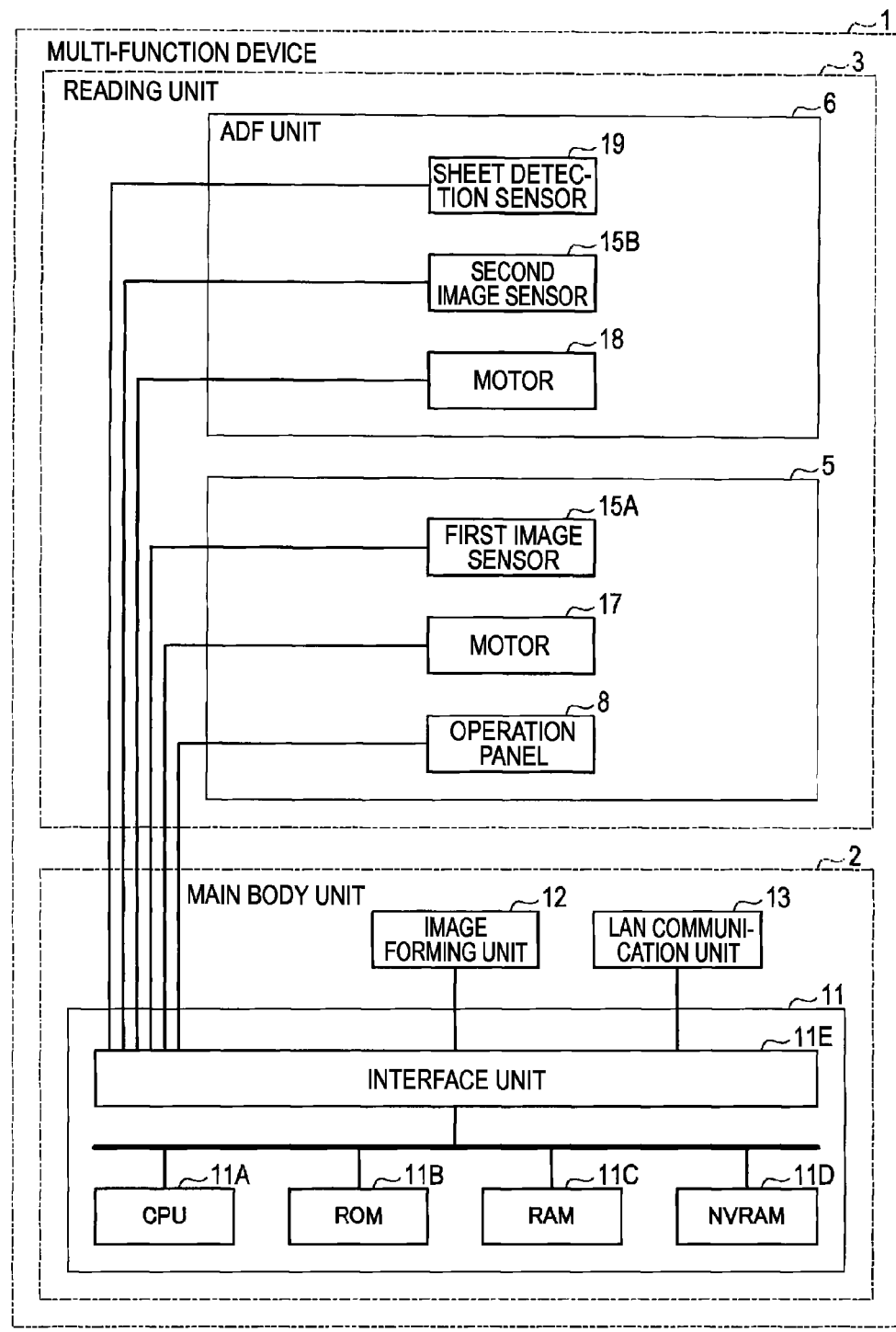
FIG. 1 is a block diagram showing a configuration of a multi-function device.

A multi-function device 1 shown in FIG. 1 has a configuration corresponding to an example of the above-described image reading apparatus. Incidentally, in below descriptions, respective directions of upper, lower, left, right, front and rear are denoted in the drawings (FIGS. 2 to 5) so as to simply describe relative positional relations of respective units configuring the multi-function device 1 and the descriptions are made using the respective directions.

As shown in FIG. 1, the multi-function device 1 (which is one example of an image reading apparatus) has a main body unit 2 and a reading unit 3. An upper surface of the main body unit 2 is formed with an opening (not shown). The reading unit 3 is mounted to an upper part of the main body unit 2 and is configured to be displaceable between a closed position and an opened position. When the reading unit 3 is located at the closed position, the opening of the main body unit 2 is closed by the reading unit 3. When the reading unit 3 is located at the opened position, the opening of the main body unit 2 is opened. Incidentally, the maintenance and the like of the components accommodated in the main body unit 2 are performed through the opening.

Figure 2A:
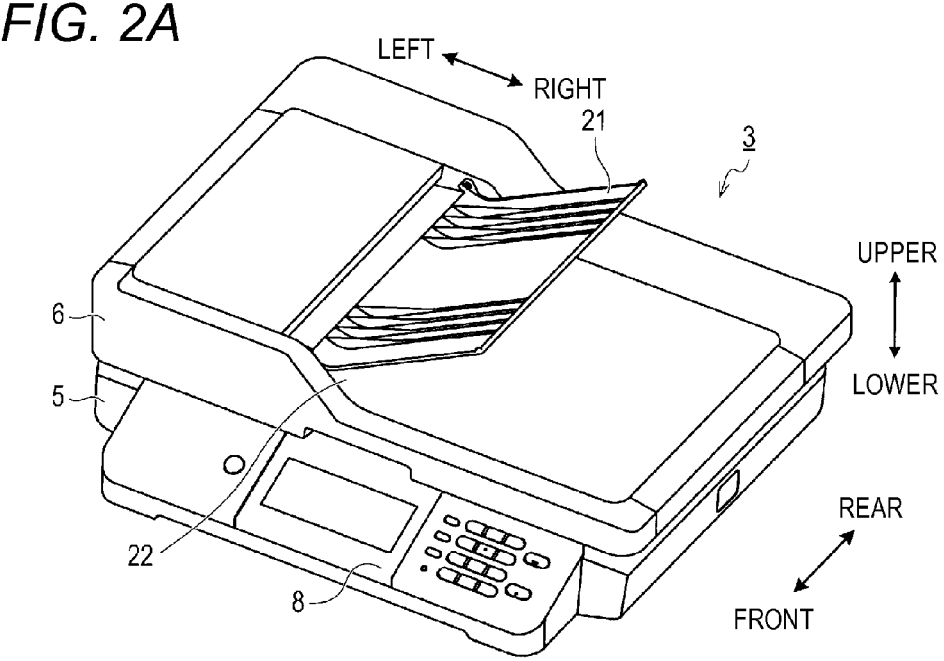
FIG. 2A is a perspective view illustrating a reading unit of which an ADF unit is located at a closed position.
Figure 2B:
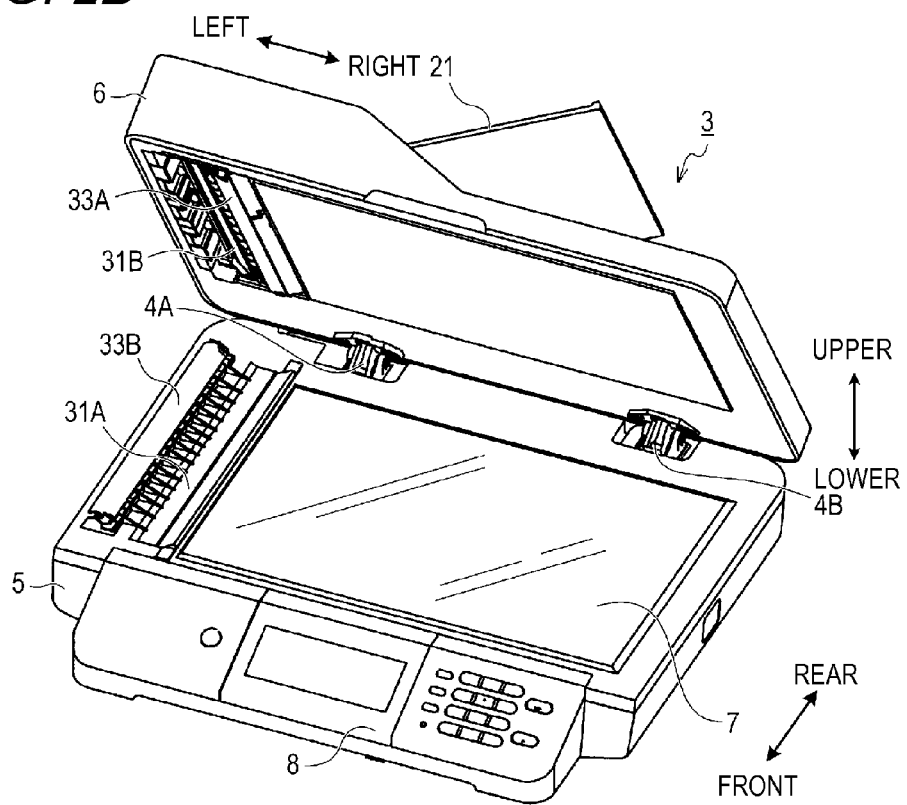
FIG. 2B is a perspective view illustrating the reading unit of which the ADF unit is located at an opened position.

The reading unit 3 has an FB unit 5 (which is one example of a first unit) and an ADF unit 6 (which is one example of a second unit). As shown in FIGS. 2A and 2B, the ADF unit 6 is mounted to the FB unit 5 through hinge parts 4A, 4B and is configured to be displaceable between the closed position (refer to FIG. 2A) and the opened position (refer to FIG. 2B).

A platen 7 for FB and the like are arranged on an upper surface of the FB unit 5. In this illustrative embodiment, the platen 7 for FB is configured by a glass plate. When the ADF unit 6 is located at the closed position (refer to FIG. 2A), an upper surface (which is one example of a support surface) of the platen 7 for FB is covered by the ADF unit 6. Also, when the ADF unit 6 is located at the opened position (refer to FIG. 2B), the upper surface of the platen 7 for FB is exposed.

A front side of the FB unit 5 is provided with an operation panel 8 that is configured to be operated by a user. The operation panel 8 is provided with an input device (for example, a touch panel, and a variety of buttons and switches), which is operated when the user inputs various commands to the multi-function device 1, and an output device (for example, a liquid crystal monitor device) for notifying the user of operation states of the multi-function device 1 and the like.

As shown in FIG. 1, the main body unit 2 has a control unit 11. The control unit 11 has a CPU 11A, a ROM 11B, a RAM 11C, an NVRAM 11D, an interface unit 11E and the like, which are well known. The CPU 11A is configured to execute predetermined processing, in response to a control program stored in the ROM 11B or RAM 11C. Thereby, the control on the respective units of the multi-function device 1 is executed.

As a control target of the control unit 11, not only the operation panel 8 but also an image forming unit 12, a LAN communication unit 13, a first image sensor 15A (which is one example of a first reading unit), a second image sensor 15B (which is one example of a second reading unit), a motor 17, a motor 18, a sheet detection sensor 19 and the like are provided. The image forming unit 12 and the LAN communication unit 13 are provided for the main body unit 2. The operation panel 8, the first image sensor 15A and the motor 17 are provided for the FB unit 5. The second image sensor 15B, the motor 18 and the sheet detection sensor 19 are provided for the ADF unit 6.

The image forming unit 12 is configured to form an image on a recording medium such as a cut sheet by an electrophotographic or inkjet method. The LAN communication unit 13 is configured by a communication interface device corresponding to wireless LAN and a communication interface device corresponding to wired LAN.

In this illustrative embodiment, both the first image sensor 15A and the second image sensor 15B are contact image sensors (CISs). The motor 17 is a driving source configured to move the first image sensor 15A along the platen 7 for FB. The motor 18 is a driving source configured to convey the sheet in the ADF unit 6. The sheet detection sensor 19 is a sensor configured to detect that a tip or rear end of the sheet in a conveying direction, which is being conveyed in the ADF unit 6, has passed through a predetermined detection position.

In this illustrative embodiment, as the sheet detection sensor 19, a contact type sensor configured to switch between on and off states depending on whether the sheet being conveyed is contacted thereto is adopted. However, the contact type sensor is arbitrarily adopted. That is, a non-contact type sensor capable of detecting that the tip or rear end of the sheet in the conveying direction has passed through a predetermined detection position may also be adopted. For example, an optical sensor capable of detecting whether the sheet being conveyed is at a light path interruption state, an optical sensor capable of detecting whether light is reflected by the sheet being conveyed, and the like may be used.

(2) Details of Structure of Reading Unit

Figure 3:
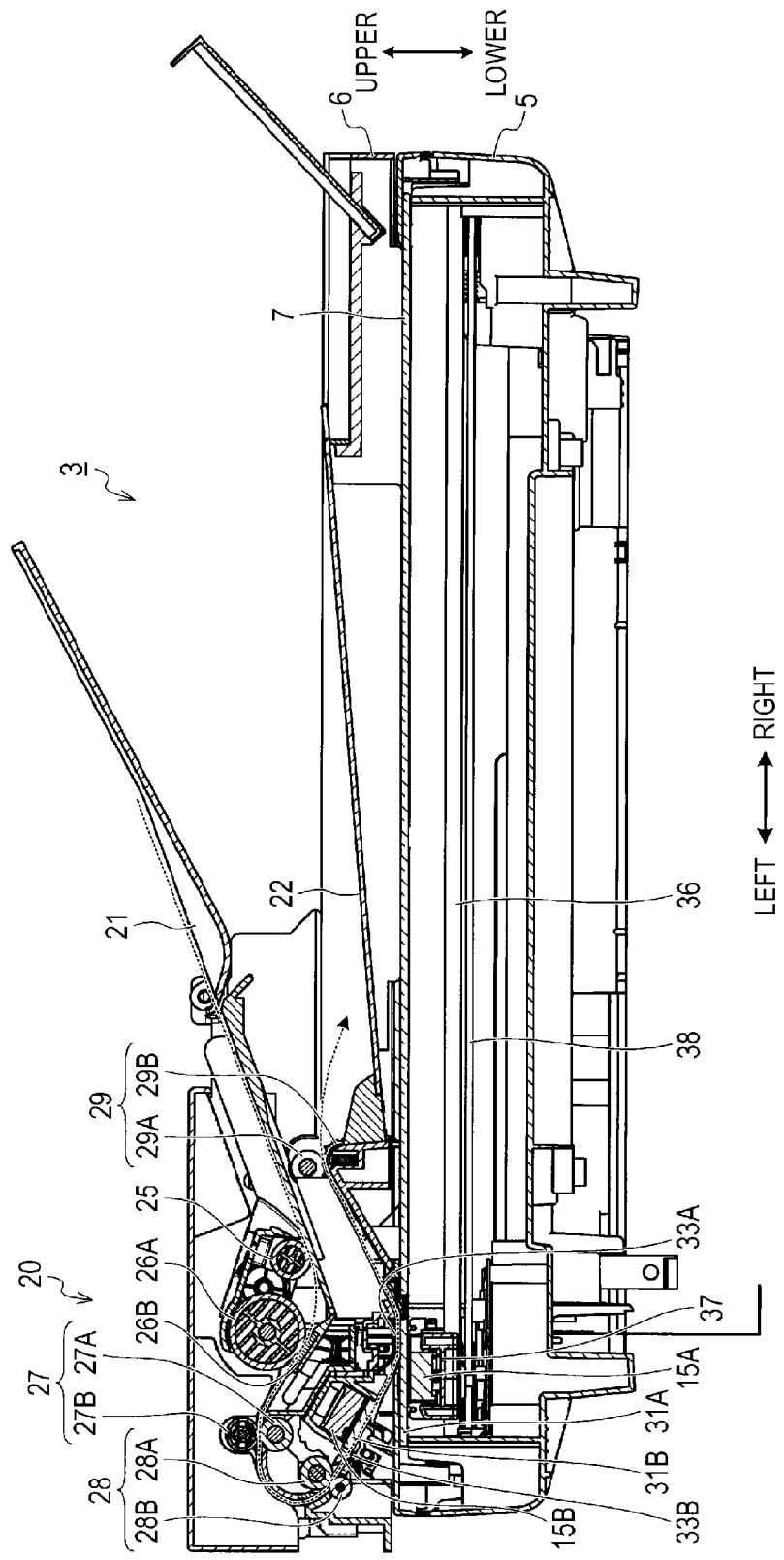
FIG. 3 is a longitudinal sectional view of the reading unit.

As shown in FIG. 3, the ADF unit 6 of the reading unit 3 has a conveyor 20 configured to convey the sheet along a predetermined conveyance path (refer to the path shown with the dotted line in FIG. 3). A feeder unit 21 configured to support a sheet to be fed to the conveyor 20 is provided at an upstream side of the conveyor 20 in the conveying direction. A discharge unit 22 configured to support the sheet discharged from the conveyor 20 is provided at a downstream side of the conveyor 20 in the conveying direction.

Figure 4:
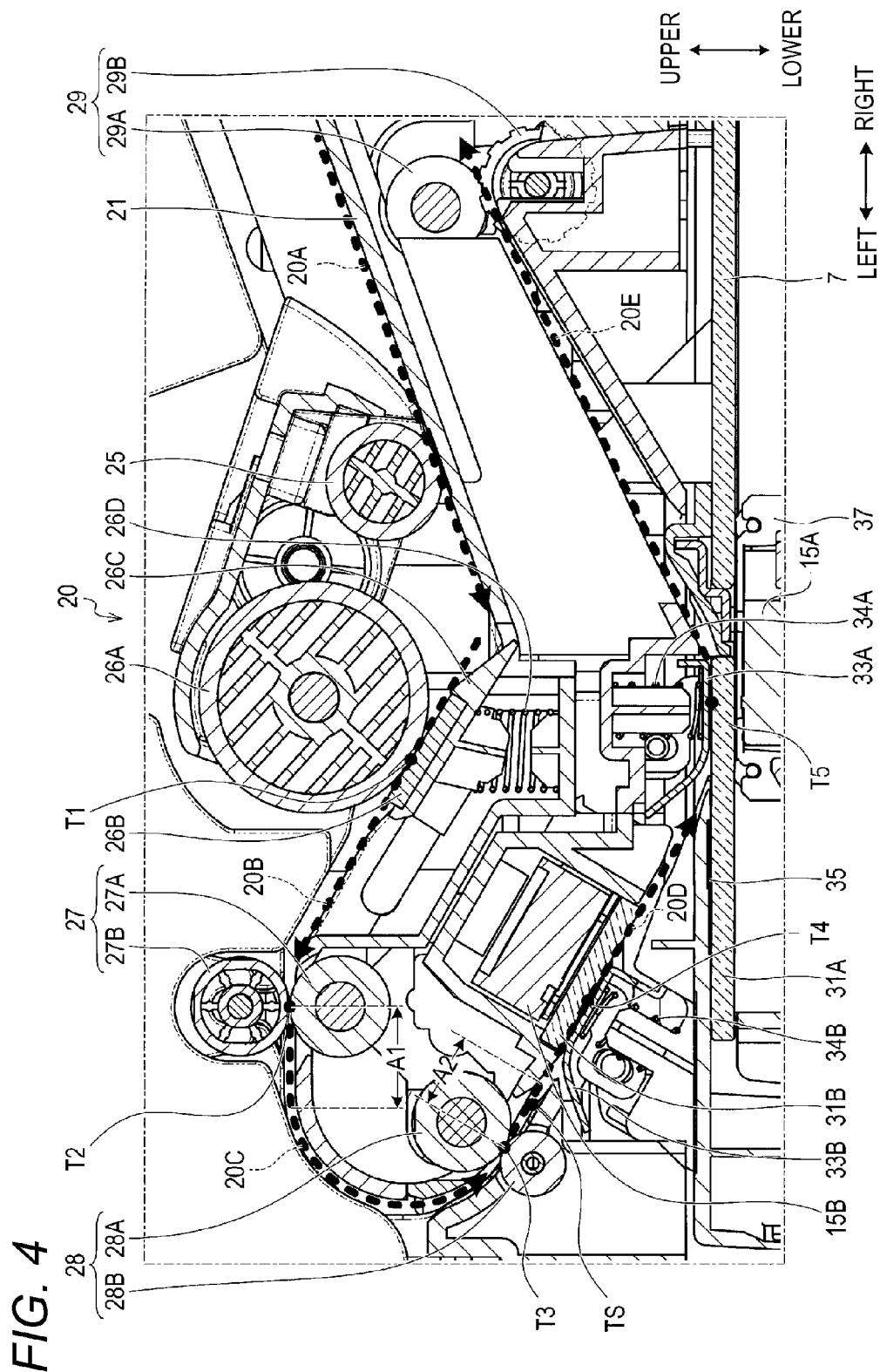
FIG. 4 is a longitudinal sectional view in which a vicinity of a conveyor is shown with being enlarged.

As shown in FIG. 3, the conveyor 20 has a suction roller 25, a first conveyance roller 26A, a separation piece 26B, a pair of second conveyance rollers 27 (a second conveyance roller 27A and a pinch roller 27B), a pair of third conveyance rollers 28 (a third conveyance roller 28A and a pinch roller 28B), a pair of fourth conveyance rollers 29 (a fourth conveyance roller 29A and a pinch roller 29B), and the like. FIG. 3 is a longitudinal sectional view of a cut surface orthogonal to an axis line becoming a rotation center of the roller group, and FIG. 4 is a longitudinal sectional view in which the roller group shown in FIG. 3 is shown with being enlarged. The conveyor 20 is provided with the roller group and a member for demarcating the conveyance path. Thereby, the conveyor 20 is formed with the conveyance path from a first guide part 20A to a fifth guide part 20E via a second guide part 20B, a third guide part 20C and a fourth guide part 20D, as shown in FIG. 4.

Incidentally, the upper-lower direction described in this illustrative embodiment coincides with a direction orthogonal to the upper surface (support surface) of the platen 7 for FB. Also, the front-rear direction described in this illustrative embodiment coincides with a direction parallel with an axis line becoming a rotation center of the first conveyance roller 26A. Also, the left-right direction described in this illustrative embodiment coincides with a direction orthogonal to the axis line becoming the rotation center of the first conveyance roller 26A and parallel with the upper surface (support surface) of the platen 7 for FB.

The first guide part 20A is configured to guide the sheet, which is conveyed from a vicinity of a downstream end of the feeder unit 21 in the conveying direction toward a further downstream side in the conveying direction, in a direction inclined at a downward gradient. The second guide part 20B is configured to guide the sheet, which is conveyed from a vicinity of a downstream end of the first guide part 20A in the conveying direction toward a further downstream side in the conveying direction, in a direction inclined at an upward gradient. That is, the first guide part 20A and the second guide part 20B are configured to form a conveyance path having a substantial V shape, as seen from a direction (the front face side described in this illustrative embodiment) shown in FIG. 4. The third guide part 20C is configured to guide the sheet, which is conveyed from a vicinity of a downstream end of the second guide part 20B in the conveying direction toward a further downstream side in the conveying direction, in a direction of curving the sheet with respect to the guiding direction on the second guide part 20B.

The fourth guide part 20D is configured to guide the sheet, which is conveyed from a vicinity of a downstream end of the third guide part 20C in the conveying direction toward a further downstream side in the conveying direction, in the direction inclined at a downward gradient. The fifth guide part 20E is configured to guide the sheet, which is conveyed from a vicinity of a downstream end of the fourth guide part 20D in the conveying direction toward a further downstream side in the conveying direction, in a direction inclined at an upward gradient. That is, the fourth guide part 20D and the fifth guide part 20E are configured to form a conveyance path having a substantial V shape, as seen from the direction (the front face side described in this illustrative embodiment) shown in FIG. 4, like the first guide part 20A and the second guide part 20B.

In this way, both the first guide part 20A and second guide part 20B and the fourth guide part 20D and fifth guide part 20E form the conveyance path having a substantial V shape, respectively. For this reason, the entire conveyance path extending from the first guide part 20A to the fifth guide part 20E also has a substantial V shape, as seen from the direction (the front face side described in this illustrative embodiment) shown in FIG. 4.

The suction roller 25 is disposed to face the first guide part 20A and is configured to convey the sheet supported by the feeder unit 21 toward the downstream side in the conveying direction. The first conveyance roller 26A and the separation piece 26B are disposed to face each other with the conveyance path defined by the second guide part 20B being interposed therebetween. The first conveyance roller 26A and the separation piece 26B are configured to separate the sheet fed from the feeder unit 21 one at a time at a first position T1 on the conveyance path and the convey the sheet toward the downstream side in the conveying direction. The first position T1 is a nip position between the first conveyance roller 26A and the separation piece 26B, and which will also be referred to as a nip position T1 hereinafter.

The separation piece 26B is held by a separation piece holder 26C (refer to FIG. 4). The separation piece holder 26C is swingably mounted to a structure such as a frame arranged in the surrounding thereof and is urged toward the first conveyance roller 26A by a separation piece urging member 26D (refer to FIG. 4). At this state, the separation piece 26B is arranged to face the first conveyance roller 26A in a direction inclined at an upward gradient toward the downstream side in the conveying direction, at a state where a surface of the separation piece 26B contacting the sheet is inclined relative to the upper surface (the support surface) of the platen 7 for FB. Thereby, the separation piece 26B configures a part of the second guide part 20B.

The pair of second conveyance rollers 27 is provided at a boundary between the second guide part 20B and the third guide part 20C and is configured to sandwich the sheet, which is conveyed from the upstream side in the conveying direction, at a second position T2 on the conveyance path and to convey the sheet toward the downstream side in the conveying direction. The boundary between the second guide part 20B and the third guide part 20C may be located around an upstream side of the third guide part 20C in the conveying direction or around a downstream side of the second guide part 20B in the conveying direction. The second position T2 is a nip position between the second conveyance roller 27A and the pinch roller 27B, and which will also be referred to as a nip position T2 hereinafter. The pair of third conveyance rollers 28 is provided at a boundary between the third guide part 20C and the fourth guide part 20D and is configured to sandwich the sheet, which is conveyed from the upstream side in the conveying direction, at a third position T3 on the conveyance path and to convey the sheet toward the downstream side in the conveying direction. The boundary between the third guide part 20C and the fourth guide part 20D may be located around an upstream side of the fourth guide part 20D in the conveying direction or around a downstream side of the third guide part 20C in the conveying direction. The third position T3 is a nip position between the third conveyance roller 28A and the pinch roller 28B, and which will also be referred to as a nip position T3 hereinafter. The pair of fourth conveyance rollers 29 is provided at a downstream end of the fifth guide part 20E in the conveying direction and is configured to sandwich the sheet, which is conveyed from the upstream side in the conveying direction, by the fourth conveyance roller 29A and the pinch roller 29B and to discharge the sheet to the discharge unit 22.

A first area A1 of the third guide part 20C within a range of a predetermined distance from the pair of second conveyance rollers 27 to a downstream side in the conveying direction is configured as a path along which a part of the sheet being guided along the first area A1 can be guided as planar without being bent. Also, a second area A2 of the fourth guide part 20D within a range of a predetermined distance from the pair of third conveyance rollers 28 to a downstream side in the conveying direction is configured as a path along which a part of the sheet being guided along the second area A2 can be guided as planar without being bent.

Incidentally, it is arbitrary whether contact places of the first area A1 and the second area A2, which are contacted to the sheet, are planar or not, inasmuch as the contact places have a shape capable of guiding a part of the sheet while keeping it planar. For example, the contact place may be formed to be planar. However, tips of a plurality of ribs arranged in a line may be configured as the contact places with the sheet and the tips of the ribs may be configured to contact the sheet and to guide a part of the sheet while keeping it planar.

A first platen for ADF 31A (which is one example of a first contact part) and a first pressing member 33A are provided at both sides of a fifth position T5, which is located at a boundary between the fourth guide part 20D and the fifth guide part 20E, with the conveyance path being interposed therebetween. Also, a second platen for ADF 31B (which is one example of a second contact part) and a second pressing member 33B (which is one example of a pressing member) are provided at both sides of a fourth position T4 on the fourth guide part 20D with the conveyance path being interposed therebetween. The fourth guide part 20D is configured to guide the sheet being conveyed from a third position T3 toward the fifth position T5 in a direction inclined at a downward gradient (which is one example of an inclination guide part). The second image sensor 15B and the second platen for ADF 31B are arranged at the fourth guide part 20D with being inclined relative to the upper surface (support surface) of the platen for FB 7.

The first platen for ADF 31A and the second pressing member 33B are arranged at the FB unit 5-side, and the second platen for ADF 31B and the first pressing member 33A are arranged at the ADF unit 6-side. For this reason, when the ADF unit 6 is located at the opened position (refer to FIG. 2B), the first platen for ADF 31A and the second pressing member 33B are exposed at the upper surface-side of the FB unit 5. Also, when the ADF unit 6 is located at the opened position (refer to FIG. 2B), the second platen for ADF 31B and the first pressing member 33A are exposed at the ADF unit 6-side.

In this illustrative embodiment, the first platen for ADF 31A and the second platen for ADF 31B are configured by glass plates and extend over a range exceeding a width of the sheet in a width direction (the front-rear direction described in this illustrative embodiment) orthogonal to the conveying direction of the sheet. The first pressing member 33A and the second pressing member 33B are made of metal or hard resin material and extend over a range exceeding the width of the sheet, like the first platen for ADF 31A and the second platen for ADF 31B.

As shown in FIG. 4, the first pressing member 33A is configured to be urged toward the first platen for ADF 31A by a first urging member 34A (a coil spring, in this illustrative embodiment). Thereby, the first pressing member 33A suppresses the sheet, which passes with contacting the upper surface of the first platen for ADF 31A, from floating from the first platen for ADF 31A. The second pressing member 33B is configured to be urged toward the second platen for ADF 31B by a second urging member 34B (a coil spring, in this illustrative embodiment). Thereby, the second pressing member 33B suppresses the sheet, which passes with contacting the upper surface of the second platen for ADF 31B, from floating from the second platen for ADF 31B.

As shown in FIG. 4, a black-white reference member 35 is provided in the vicinity of a center of the upper surface of the first platen for ADF 31A. The black-white reference member 35 is a member having white and black parts forming a predetermined pattern. When reading an image by the first image sensor 15A, the black-white reference member 35 over the first platen for ADF 31A is read in advance by the first image sensor 15A. The read data of a monochrome image is used when an origin position of the first image sensor 15A is corrected or shading correction is performed by the CPU 11A. When reading an image of the sheet being conveyed by the conveyor 20, the sheet is contacted to the first platen for ADF 31A in a right area of the black-white reference member 35 in FIG. 4. In FIG. 4, a width of the first platen for ADF 31A in the left-right direction is configured to secure an area for reading a sheet image, an area for reading the black-white reference member 35, an area for fixing the first platen for ADF 31A, and the like.

In the vicinity of a detection position TS downstream from the third position T3 and upstream from the fourth position T4 in the conveying direction, the sheet detection sensor 19 (refer to FIG. 1) capable of detecting the sheet passing the detection position TS is arranged. A roller configured to rotate with contacting the sheet is not disposed within a range downstream from the pair of third conveyance rollers 28 and upstream from the fifth position T5 in the conveying direction and the sheet is conveyed substantially straight from the third position T3 to the fifth position T5. For this reason, the conveying speed of the sheet is little changed in a zone from the third position T3 to the fifth position T5, so that it is possible to detect timings at which the tip or rear end of the sheet in the conveying direction reaches the fourth position T4 and the fifth position T5, at the single detection position TS.

As shown in FIG. 3, the FB unit 5 is provided with a guide shaft 36, a carriage 37, a toothed belt 38 and the like. The guide shaft 36 is a metallic round bar and extends in the left-right direction described in this illustrative embodiment in parallel with lower surfaces of the first platen for ADF 31A and platen for FB 7 ranging from the below of the first platen for ADF 31A to the below of the platen for FB 7.

The carriage 37 is slidably mounted to the guide shaft 36 and is supported to be reciprocally movable in the extension direction (the left-right direction described in this illustrative embodiment) of the guide shaft 36 along the guide shaft 36. The carriage 37 is coupled to the endless toothed belt 38 and is reciprocally moved in the left-right direction described in this illustrative embodiment, in conformity to circulation of the toothed belt 38.

The first image sensor 15A is mounted on the carriage 37 and is thus moved together with the carriage 37 when the carriage 37 is moved. Incidentally, the first image sensor 15A is configured to be urged toward the first platen for ADF 31A and the platen for FB 7 by an urging member (a coil spring, in this illustrative embodiment), so that a distance between the first image sensor 15A and the first platen for ADF 31A and platen for FB 7 is kept constant. The second image sensor 15B is arranged at a predetermined position and is configured not to move from the position. The second image sensor 15B is closely contacted to the second platen for ADF 31B by its own weight, so that a distance between the second image sensor 15B and the second platen for ADF 31B is kept constant. Incidentally, an urging member configured to urge the second image sensor 15B toward the second platen for ADF 31B may also be provided.

A plurality of reading elements provided for the first image sensor 15A and the second image sensor 15B is arranged in the front-rear direction described in this illustrative embodiment. When reading an image of the sheet placed on the upper surface of the platen for FB 7, the first image sensor 15A reads the image with moving together with the carriage 37.

In a case of reading an image of the sheet being conveyed by the conveyor 20, the first image sensor 15A is stopped at a stop position that is below the first pressing member 33A and the first platen for ADF 31A. At this state, the first image sensor 15A is configured to read an image of a first surface of the sheet passing with contacting the first platen for ADF 31A at the fifth position T5 (hereinafter, also referred to as first reading position T5) on the conveyance path. The second image sensor 15B is configured to read an image of a second surface of the sheet passing with contacting the second platen for ADF 31B at the fourth position T4 (hereinafter, also referred to as second reading position T4) on the conveyance path. Incidentally, as described above, in this illustrative embodiment, it is possible to detect the timings at which the sheet reaches the fourth position T4 and the fifth position T5 by the single sheet detection sensor 19. For this reason, the CPU 11A can control the reading start timings at the second reading position T4 and the first reading position T5, based on a detection signal from the sheet detection sensor 19.

In the multi-function device 1 as described above, an arrangement range R1 of the first conveyance roller 26A and the separation piece 26B and an arrangement range C1 of the first image sensor 15A stopped at the stop position overlap with each other in the direction (the left-right direction described in this illustrative embodiment) parallel with the upper surface of the platen for FB 7 and orthogonal to an axis line becoming the rotation center of the first conveyance roller 26A, as seen from the direction (the front-rear direction described in this illustrative embodiment) parallel with the axis line becoming the rotation center of the first conveyance roller 26A. That is, as shown in FIG. 5, when seeing the respective components from the front (the front face-side of the apparatus) described in this illustrative embodiment, at least parts of the components are arranged at positions (i.e., positions at which the arrangement ranges overlap with each other at least in the left-right direction) seen to be lined in the upper-lower direction.

For this reason, as compared to a configuration where the first conveyance roller 26A and separation piece 26B and the first image sensor 15A stopped at the stop position are arranged at positions at which the arrangement ranges thereof do not overlap with each other in the direction (the left-right direction described in this illustrative embodiment), which is parallel with the upper surface of the platen for FB 7 and is orthogonal to the axis line becoming the rotation center of the first conveyance roller 26A, as seen from the direction parallel with the axis line becoming the rotation center of the first conveyance roller 26A, since the arrangement ranges of the first conveyance roller 26A, the separation piece 26B and the first image sensor 15A according to the above-described illustrative embodiment overlap with each other at least in the direction (the left-right direction described in this illustrative embodiment), which is parallel with the upper surface of the platen for FB 7 and is orthogonal to the axis line becoming the rotation center of the first conveyance roller 26A, it is possible to reduce an overall arrangement range of the first conveyance roller 26A, the separation piece 26B and the first image sensor 15A by an overlapping amount of the arrangement ranges thereof and to thus make the reading unit 3 compact.

Figure 5:
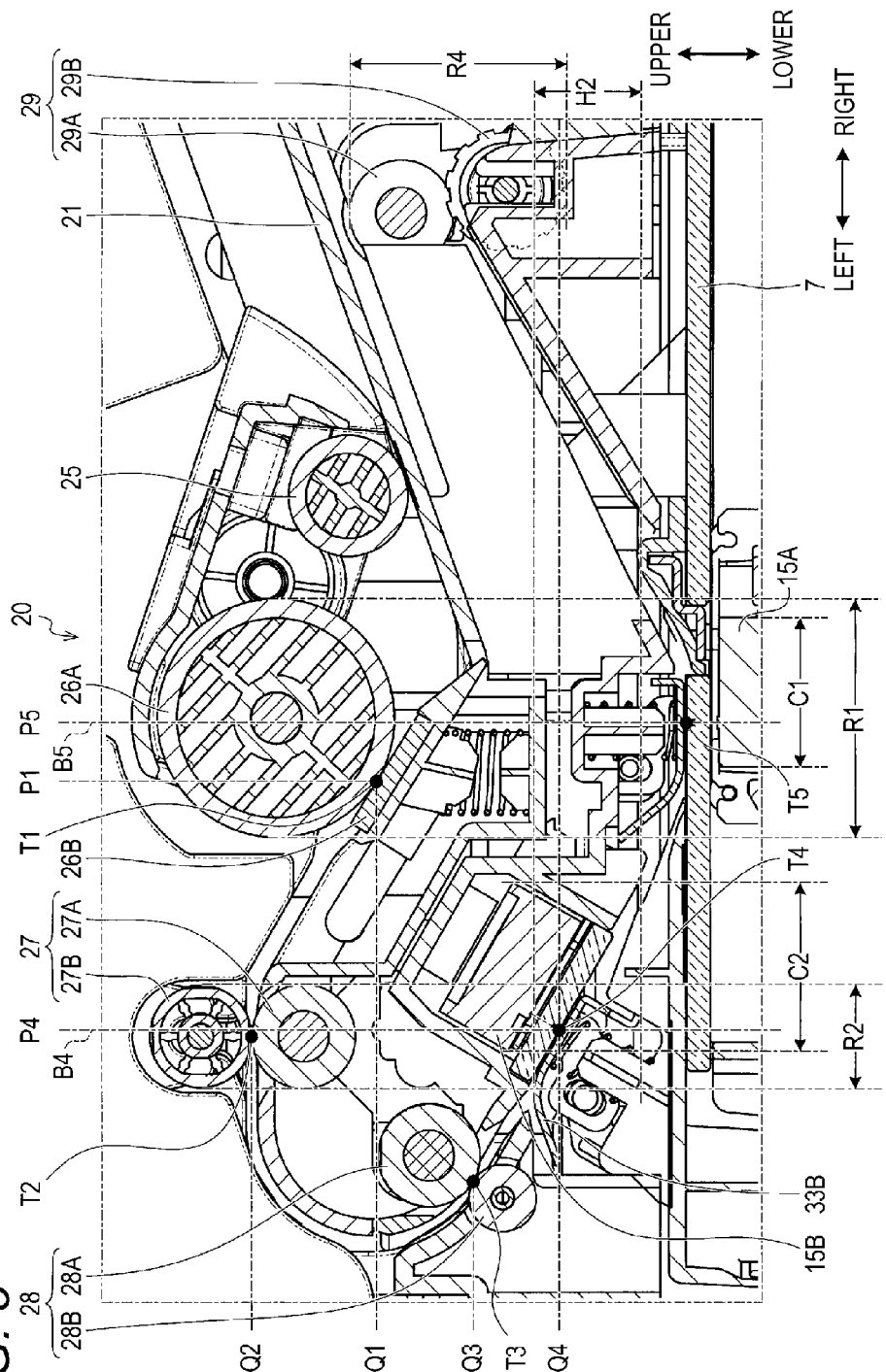
FIG. 5 illustrates relative positional relations of components in the vicinity of the conveyor.

As shown in FIG. 5, the nip position T1 of the first conveyance roller 26A and the separation piece 26B is located at a position P1 that is located across a position P5 of a virtual boundary surface B5 passing through the first reading position T5 from the feeder unit 21 with respect to the direction (the left-right direction described in this illustrative embodiment) parallel with the upper surface of the platen for FB 7 and orthogonal to the axis line becoming the rotation center of the first conveyance roller 26A, as seen from the direction (the front-rear direction described in this illustrative embodiment) parallel with the axis line becoming the rotation center of the first conveyance roller 26A. For this reason, as compared to a configuration where when a distance from the feeder unit 21 to the nip position T1 is configured to be substantially the same as the related art and the first reading position T5 is also set to the same position as the related art, the nip position T1 and the feeder unit 21 are located at the same side with respect to the position P5 of the boundary surface B5, the arrangement range of the feeder unit 21 can be made to be closer to the boundary surface. Therefore, it is possible to reduce a protruding amount of the feeder unit 21 in a direction separating from the boundary surface B5 and to thus make the reading unit 3 compact.

As shown in FIG. 5, the nip position T2 of the pair of second conveyance rollers 27 is located at a position Q2 that is more spaced from the upper surface of the platen for FB 7 than a position Q1 of the nip position T1 of the first conveyance roller 26A and the separation piece 26B with respect to the direction orthogonal to the upper surface of the platen for FB 7, as seen from the direction (the front-rear direction described in this illustrative embodiment) parallel with the axis line becoming the rotation center of the first conveyance roller 26A. The nip position T2 of the pair of second conveyance rollers 27 is determined regarding the height position Q2 thereof, also considering a standpoint of securing the conveyance path (for example, the third guide part 20C and the fourth guide part 20D shown in FIG. 4) extending from the nip position T2 toward the further downstream side in the conveying direction. For this reason, when the first conveyance roller 26A is arranged at the position Q1 closer to the upper surface of the platen for FB 7 than the height position Q2 on the basis of the height position Q2 of the nip position 2 of the pair of second conveyance rollers 27, it is possible to make the structure adjacent to the first conveyance roller 26A thin. Also, even when a diameter of the first conveyance roller 26A is made to be large so as to improve the separation performance, it is easy to secure an accommodation space thereof.

As shown in FIG. 5, the nip position T1 of the first conveyance roller 26A and the separation piece 26B is located at the position P1 between the position P5 of the virtual boundary surface B5 orthogonal to the upper surface of the platen for FB 7 and passing through the first reading position T5 and a position P4 of a virtual boundary surface B4 orthogonal to the upper surface of the platen for FB 7 and passing through the second reading position T4 with respect to the direction (the left-right direction described in this illustrative embodiment) parallel with the upper surface of the platen for FB 7 and orthogonal to the axis line becoming the rotation center of the first conveyance roller 26A, as seen from the direction (the front-rear direction described in this illustrative embodiment) parallel with the axis line becoming the rotation center of the first conveyance roller 26A. For this reason, as compared to a configuration where the nip position T1 of the first conveyance roller 26A and the separation piece 26B is located at a position deviating from between the boundary surfaces (between the positions P4 and P5), on a condition that a distance (a distance between the positions P4 and P5) between the above-described two boundary surfaces B4 and B5 is substantially the same as such a comparison configuration, it is possible to set the nip position T1 of the first conveyance roller 26A and the separation piece 26B, the first reading position T5 and the second reading position T4 within the narrower range with respect to the direction (the left-right direction described in this illustrative embodiment) parallel with the upper surface of the platen for FB 7 and orthogonal to the axis line becoming the rotation center of the first conveyance roller 26A. Thereby, it is possible to make the structure of the reading unit 3 more compact.

As shown in FIG. 5, an arrangement range R2 of the pair of second conveyance rollers 27 and an arrangement range C2 of the second image sensor 15B overlap with each other in the direction (the left-right direction described in this illustrative embodiment) parallel with the upper surface of the platen for FB 7 and orthogonal to the axis line becoming the rotation center of the first conveyance roller 26A, as seen from the direction (the front-rear direction described in this illustrative embodiment) parallel with the axis line becoming the rotation center of the first conveyance roller 26A. That is, as shown in FIG. 5, when seeing the respective components from the front (the front face-side of the apparatus) described in this illustrative embodiment, at least parts of the components are arranged at positions (i.e., positions at which the arrangement ranges overlap with each other at least in the left-right direction) seen to be lined in the upper-lower direction. For this reason, as compared to a configuration where the pair of second conveyance rollers 27 and the second image sensor 15B are arranged at positions at which the arrangement ranges thereof do not overlap with each other in the direction (the left-right direction described in this illustrative embodiment) parallel with the upper surface of the platen for FB 7 and orthogonal to the axis line becoming the rotation center of the first conveyance roller 26A, as seen from the direction (the front-rear direction described in this illustrative embodiment) parallel with the axis line becoming the rotation center of the first conveyance roller 26A, it is possible to reduce an overall arrangement range of the pair of second conveyance rollers 27 and the second image sensor 15B with respect to the direction (the left-right direction described in this illustrative embodiment) parallel with the upper surface of the platen for FB 7 and orthogonal to the axis line becoming the rotation center of the first conveyance roller 26A. Thereby, it is possible to make the reading unit 3 more compact.

As shown in FIG. 5, the nip position T1 of the first conveyance roller 26A and the separation piece 26B is located between the height position Q2 of the nip position T2 of the second conveyance rollers 27 and a height position Q3 of the nip position T3 of the pair of third conveyance rollers 28 with respect to the position Q1 in the direction orthogonal to the upper surface of the platen for FB 7, as seen from the direction (the front-rear direction described in this illustrative embodiment) parallel with the axis line becoming the rotation center of the first conveyance roller 26A. For this reason, as compared to a configuration where the nip position T1 of the first conveyance roller 26A and the separation piece 26B is located at a higher position than between the positions Q2 and Q3, on a condition that the nip position T2 of the pair of second conveyance rollers 27 and the nip position T3 of the pair of third conveyance rollers 28 are located at the substantially same positions as such a comparison configuration, it is possible to make the structure adjacent to the first conveyance roller 26A and separation piece 26B closer to the upper surface of the platen for FB 7 with respect to the direction orthogonal to the upper surface of the platen for FB 7. Thereby, it is possible to make the structure of the reading unit 3 thin.

As shown in FIG. 5, the pair of fourth conveyance rollers 29 is arranged at a position overlapping with a height position Q4 of the second reading position T4 with respect to an arrangement range R4 in the direction orthogonal to the upper surface of the platen for FB 7, as seen from the direction (the front-rear direction described in this illustrative embodiment) parallel with the axis line becoming the rotation center of the first conveyance roller 26A. That is, as shown in FIG. 5, when seeing the respective components from the front (the front face-side of the apparatus) described in this illustrative embodiment, at least parts of the components are arranged at positions (i.e., positions at which the arrangement ranges overlap with each other at least in the upper-lower direction) seen to be lined in the left-right direction. For this reason, as compared to a structure where a height position of the pair of fourth conveyance rollers 29 is arranged at a position more spaced from the upper surface of the platen for FB 7 than the second reading position T4 with respect to the direction orthogonal to the upper surface of the platen for FB 7, as seen from the direction parallel with the axis line becoming the rotation center of the first conveyance roller 26A, it is possible to make the structure adjacent to the pair of fourth conveyance rollers 29 closer to the upper surface of the platen for FB 7 with respect to the direction orthogonal to the upper surface of the platen for FB 7. Thereby, it is possible to make the structure of the reading unit 3 thin.

As shown in FIG. 5, the arrangement range R4 of the pair of fourth conveyance rollers 29 in the direction orthogonal to the upper surface of the platen for FB 7, as seen from the direction parallel with the axis line becoming the rotation center of the first conveyance roller 26A, is arranged at a position at which at least a part of the arrangement range R4 overlaps with an arrangement range H2 of the second pressing member 33B. That is, as shown in FIG. 5, when seeing the respective components from the front (the front face-side of the apparatus) described in this illustrative embodiment, at least parts of the components are arranged at positions (i.e., positions at which the arrangement ranges overlap with each other at least in the upper-lower direction) seen to be lined in the left-right direction. For this reason, as compared to a structure where the pair of fourth conveyance rollers 29 is arranged at a position more spaced from the upper surface of the platen for FB 7 than the second pressing member 33B with respect to the direction orthogonal to the upper surface of the platen for FB 7, as seen from the direction parallel with the axis line becoming the rotation center of the first conveyance roller 26A, it is possible to make the structure adjacent to the pair of fourth conveyance rollers 29 closer to the upper surface of the platen for FB 7 with respect to the direction orthogonal to the upper surface of the platen for FB 7. Thereby, it is possible to make the structure of the reading unit 3 thin.

(3) Modifications

Although the image reading apparatus has been described with reference to the specific illustrative embodiment, the present invention is not limited to the above illustrative embodiment and can be variously implemented without departing from the technical spirit of the present invention.

For example, in the above illustrative embodiment, the image reading apparatus configured as the multi-function device has been exemplified as the image reading apparatus of the present invention. However, it is arbitrary whether the image reading apparatus is configured as the multi-function device, and the configuration of the present invention can be adopted for an image reading apparatus having a single function, a copier, a facsimile apparatus and the like.

What is claimed is:

1. An image reading apparatus comprising:
   a first housing having a support surface for supporting a reading target; and
   a second housing mounted to the first housing and configured to be displaceable between a closed position at which the support surface is covered and an opened position at which the support surface is exposed,
   wherein the second housing comprises a conveyor configured to convey a sheet along a predetermined conveyance path,
   wherein the first housing comprises:
      a first contact part to which the sheet being conveyed by the conveyor is contacted; and
      a first sensor configured to:
         read an image of the reading target, which is supported by the support surface, while the first sensor moves along the support surface; and
         read an image of the sheet as the sheet is conveyed through a first reading position and contacting the first contact part, while the first sensor is stopped at the first reading position facing the conveyance path with the first contact part being interposed therebetween,
   wherein the conveyor comprises:
      a first conveyance roller configured to separate the sheet fed from an upstream side in a conveying direction one at a time at a first position on the conveyance path and to convey the sheet toward a downstream in a conveying direction;
      a separation piece configured to separate the sheet one at a time at a first nip position between the first conveyance roller and the separation piece;
      a first pressing member contactable with the sheet passing through the first reading position, the first pressing member facing the first sensor stopped at the first reading position,
   wherein the first conveyance roller and the separation piece and the first sensor stopped at the first reading position are arranged at positions at which an arrangement range of the first conveyance roller and the separation piece and an arrangement range of the first sensor overlap with each other with respect to a first direction parallel with the support surface and orthogonal to an axis line becoming a rotation center of the first conveyance roller, as seen from a second direction parallel with the axis line becoming the rotation center of the first conveyance roller, and
   wherein the conveyance roller, the separation piece, the first nip position, the first reading position, and the first pressing member are arranged at positions overlapping with the arrangement range of the first conveyance roller and the separation piece with respect to the first direction, as seen from the second direction.

2. The image reading apparatus according to claim 1, further comprising:
   a feeder configured to support the sheet to be fed to the conveyor,
   wherein the separation piece is configured to face the first conveyance roller with a contact surface thereof to the sheet being inclined relative to the support surface, and
   wherein a nip position of the first conveyance roller and the separation piece is located at a position that is located across a position of a virtual boundary surface, which is orthogonal to the support surface and passes through the first reading position, from the feeder with respect to the first direction, as seen from the second direction.

3. The image reading apparatus according to claim 1,
   wherein the conveyor is configured to curve the conveying direction of the sheet in a range from a second position to a third position after the sheet passes through the first position, when conveying the sheet along the conveyance path,
   wherein the conveyor comprises a pair of second conveyance rollers provided in the vicinity of the second position and configured to convey the sheet toward the third position, and
   wherein a nip position of the pair of second conveyance rollers is located at a position more spaced from the support surface than a position of the nip position of the first conveyance roller and the separation piece with respect to a third direction orthogonal to the support surface, as seen from the second direction.

4. The image reading apparatus according to claim 3, wherein the second housing comprises:
   a second contact part, to which the sheet being conveyed by the conveyor is contacted; and
   a second sensor configured to read an image of the sheet, which passes through a second reading position with contacting the second contact part,
   wherein in a range from the third position to a fifth position via a fourth position, the conveyor is configured to bring a second surface of the sheet into contact with the second contact part at the fourth position and to bring a first surface of the sheet into contact with the first contact part at the fifth position,
   wherein the conveyor comprises a pair of third conveyance rollers provided in the vicinity of the third position and configured to convey the sheet toward the fourth position, and
   wherein the nip position of the first conveyance roller and the separation piece is located at a position between a position of a virtual boundary surface, which is orthogonal to the support surface and passes through the first reading position, and a position of a virtual boundary surface, which is orthogonal to the support surface and passes through the second reading position, with respect to the first direction, as seen from the second direction.

5. The image reading apparatus according to claim 4, wherein the conveyor comprises an inclination guide part configured to guide the sheet being conveyed from the third position toward the fifth position in a direction inclined at a downward gradient, and
   wherein the second sensor and the second contact part are arranged at the inclination guide part with being inclined relative to the support surface.

6. The image reading apparatus according to claim 4, wherein the pair of second conveyance rollers and the second sensor are arranged at positions at which an arrangement range of the pair of second conveyance rollers and an arrangement range of the second sensor overlap with each other with respect to the first direction, as seen from the second direction.

7. The image reading apparatus according to claim 4, wherein the nip position of the first conveyance roller and the separation piece is located at a position between the nip position of the pair of second conveyance rollers and a nip position of the pair of third conveyance rollers with respect to the third direction, as seen from the second direction.

8. The image reading apparatus according to claim 4, further comprising:
   a discharger configured to support the sheet discharged from the conveyor,
   wherein the conveyor comprises a pair of fourth conveyance rollers configured to discharge the sheet to the discharger, and
   wherein the pair of fourth conveyance rollers and the second reading position are located at positions at which an arrangement range of the pair of fourth conveyance rollers and a position of the second reading position overlap with each other with respect to the third direction, as seen from the second direction.

9. The image reading apparatus according to claim 8, wherein the conveyor comprises a second pressing member configured to contact the sheet passing through the fourth position for suppressing the sheet from floating from the second contact part, and
   wherein the pair of fourth conveyance rollers and the second pressing member are located at position at which the arrangement range of the pair of fourth conveyance rollers and an arrangement range of the second pressing member overlap with each other with respect to the third direction, as seen from the second direction.

10. An image reading apparatus comprising:
    a first housing having a support surface for supporting a reading target; and
    a second housing mounted to the first housing and configured to be displaceable between a closed position at which the support surface is covered and an opened position at which the support surface is exposed,
    wherein the second housing comprises a conveyor configured to convey a sheet along a predetermined conveyance path,
    wherein the first housing comprises:
      a first contact part to which the sheet being conveyed by the conveyor is contacted; and
      a first sensor configured to:
        read an image of the reading target, which is supported by the support surface, with moving along the support surface; and
        read an image of the sheet, which is passing through a first reading position with contacting the first contact part, while the first sensor stops at a stop position facing the conveyance path with the first contact part being interposed therebetween,
    wherein the conveyor comprises:
      a first guide part configured to guide the sheet, which is conveyed from a vicinity of a downstream end of a feeder in a conveying direction toward a further downstream side in the conveying direction, in a direction inclined at a downward gradient;
      a second guide part configured to guide the sheet, which is conveyed from a vicinity of a downstream end of the first guide part in the conveying direction toward a further downstream side in the conveying direction, in a direction inclined at an upward gradient;
      a third guide part configured to guide the sheet, which is conveyed from a vicinity of a downstream end of the second guide part in the conveying direction toward a further downstream side in the conveying direction, in a direction of curving the sheet with respect to the guiding direction of the second guide part;
      a fourth guide part configured to guide the sheet, which is conveyed from a vicinity of a downstream end of the third guide part in the conveying direction toward a further downstream side in the conveying direction, in a direction inclined at a downward gradient;
      a fifth guide part configured to guide the sheet, which is conveyed from a vicinity of a downstream end of the fourth guide part in the conveying direction toward a further downstream side in the conveying direction, in a direction inclined at an upward gradient;
      a first conveyance roller, which is arranged at the second guide part, and which is configured to separate the sheet fed from the feeder one at a time at a first position and to convey the sheet toward the downstream side in the conveying direction; and a separation piece configured to separate the sheet one at a time in cooperation with the first conveyance roller, and wherein the first conveyance roller and the separation piece and the first sensor stopped at the stop position are arranged at positions at which an arrangement range of the first conveyance roller and the separation piece and an arrangement range of the first sensor overlap with each other with respect to a direction parallel with the support surface and orthogonal to an axis line becoming a rotation center of the first conveyance roller, as seen from a direction parallel with the axis line becoming the rotation center of the first conveyance roller.

11. The image reading apparatus according to claim 10, further comprising:
a feeder configured to support the sheet to be fed to the conveyor; and
a discharger configured to support the sheet discharged from the conveyor.

12. An image reading apparatus comprising:
a first housing having a support surface for supporting a reading target; and
a second housing mounted to the first housing and configured to be displaceable between a closed position at which the support surface is covered and an opened position at which the support surface is exposed,
wherein the second housing comprises a conveyor configured to convey a sheet along a predetermined conveyance path,
wherein the first housing comprises:
a first contact part to which the sheet being conveyed by the conveyor is contacted; and
a first sensor configured to:
read an image of the reading target, which is supported by the support surface, while moving along the support surface; and
read an image of the sheet as the sheet is conveyed through a first reading position and contacting the first contact part, while the first sensor is stopped at a first reading position facing the conveyance path with the first contact part being interposed therebetween,
wherein the conveyor comprises:
a first conveyance roller configured to separate the sheet fed from an upstream side in a conveying direction one at a time at a first position on the conveyance path and to convey the sheet toward a downstream in a conveying direction;
a separation piece configured to separate the sheet one at a time at a first nip position between the first conveyance roller and the separation piece; and
a first pressing member contactable with the sheet passing through the first reading position, the first pressing member facing the first sensor when the first sensor stops at the first reading position, and
wherein at least one virtual line orthogonal to an extension plane of an upper surface of the support surface, intersects the first conveyance roller, the separation piece, the first pressing member, the first reading position and the first sensor.

13. The image reading apparatus according to claim 12, wherein the separation piece is configured to face the first conveyance roller with a contact surface thereof to the sheet being inclined relative to the support surface, and
wherein the at least one virtual line intersects the first conveyance roller, the separation piece and the first reading position.

14. The image reading apparatus according to claim 12, further comprising:
a feeder configured to support the sheet to be fed to the conveyor,
wherein the separation piece is configured to face the first conveyance roller with a contact surface thereof to the sheet being inclined relative to the support surface, and
wherein a nip position of the first conveyance roller and the separation piece is located at a position that is located across a position of another one of the virtual lines intersecting the first conveyance roller and the first reading position, from the feeder with respect to a direction parallel with the support surface and orthogonal to the axis line becoming the rotation center of the first conveyance roller.

15. The image reading apparatus according to claim 12,
wherein the conveyor is configured to curve the conveying direction of the sheet in a range from a second position to a third position after the sheet passes through the first position, when conveying the sheet along the conveyance path,
wherein the conveyor comprises a pair of second conveyance rollers provided in the vicinity of the second position and configured to convey the sheet toward the third position, and
wherein a nip position of the pair of second conveyance rollers is located at a position more spaced from the support surface than a position of the nip position of the first conveyance roller and the separation piece with respect to a direction orthogonal to the support surface, as seen from a direction parallel with the axis line becoming the rotation center of the first conveyance roller.

16. The image reading apparatus according to claim 15,
wherein the second housing comprises:
a second contact part, to which the sheet being conveyed by the conveyor is contacted; and
a second sensor configured to read an image of the sheet, which passes through a second reading position with contacting the second contact part,
wherein in a range from the third position to a fifth position via a fourth position, the conveyor is configured to bring a second surface of the sheet into contact with the second contact part at the fourth position and to bring a first surface of the sheet into contact with the first contact part at the fifth position,
wherein the conveyor comprises a pair of third conveyance rollers provided in the vicinity of the third position and configured to convey the sheet toward the fourth position, and
wherein the nip position of the first conveyance roller and the separation piece is located at a position between a position of another one of the virtual lines intersecting the first conveyance roller and the first reading position, and a position of a still another one of the virtual lines intersecting the pair of second conveyance rollers and the second reading position, with respect to the direction parallel with the support surface and orthogonal to the axis line becoming the rotation center of the first conveyance roller.

17. The image reading apparatus according to claim 12, further comprising:
a feeder configured to support the sheet to be fed to the conveyor; and
a discharger configured to support the sheet discharged from the conveyor.

* * * * *